United States Patent [19]

Antonis

[11] Patent Number: 4,997,339
[45] Date of Patent: Mar. 5, 1991

[54] DEVICE FOR STACKING TRAYS WITH ARTICLES

[75] Inventor: Matheus E. Antonis, Rijkevoort, Netherlands

[73] Assignee: FPS Food Processing Systems B.V., Barneveld, Netherlands

[21] Appl. No.: 377,129

[22] Filed: Jul. 10, 1989

[30] Foreign Application Priority Data

Mar. 8, 1989 [NL] Netherlands ............... 8900567

[51] Int. Cl.$^5$ ............................................. B65G 57/00
[52] U.S. Cl. .............................. 414/791.2; 414/790.1; 414/793.7
[58] Field of Search ........... 414/790, 790.1, 791.2, 414/793.7, 792.8, 793.4

[56] References Cited

U.S. PATENT DOCUMENTS

| | | |
|---|---|---|
| 2,407,782 | 9/1946 | Hardy . |
| 2,919,821 | 1/1960 | Young ................. 414/793.7 X |
| 3,792,784 | 2/1974 | Mosterd ................. 414/791.2 X |
| 3,912,070 | 10/1975 | Cronk et al. ............. 414/793.7 X |

FOREIGN PATENT DOCUMENTS

| | | |
|---|---|---|
| 1254524 | 11/1967 | Fed. Rep. of Germany . |
| 1683862 | 2/1970 | Fed. Rep. of Germany . |
| 0549894 | 3/1958 | Italy .................. 414/793.4 |
| 0598810 | 2/1978 | U.S.S.R. ............... 414/793.7 |
| 2163119 | 2/1986 | United Kingdom . |

Primary Examiner—Robert J. Spar
Assistant Examiner—James T. Eller, Jr.
Attorney, Agent, or Firm—Edmund M. Jaskiewicz

[57] ABSTRACT

A device for stacking egg-trays comprising a feed conveyor (2) advancing the trays one after the other, a second conveyor (3) for discharging the trays stacked on each other, a transport mechanism (15) operating between the feed and the discharge conveyor having carrying forks for transporting one tray at a time onto a support platform (30) which collects the trays and periodically oscillates through a 90° arc so as to stack the subsequent trays in a staggered relationship. The platform is also capable of a vertical movement from a high position to a low positioin and vice versa for depositing a stack of trays upon the discharge conveyor.

8 Claims, 3 Drawing Sheets

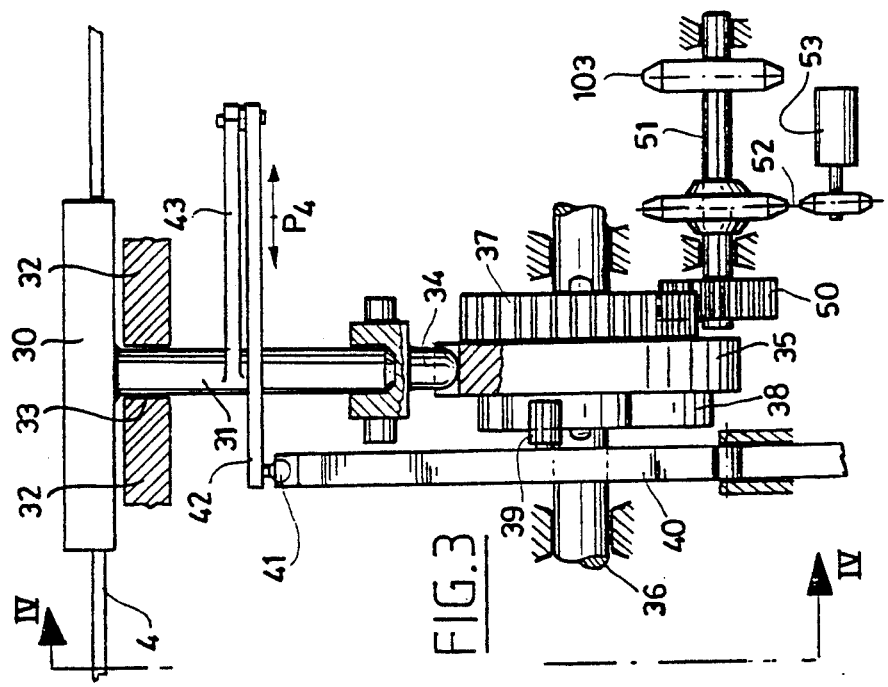
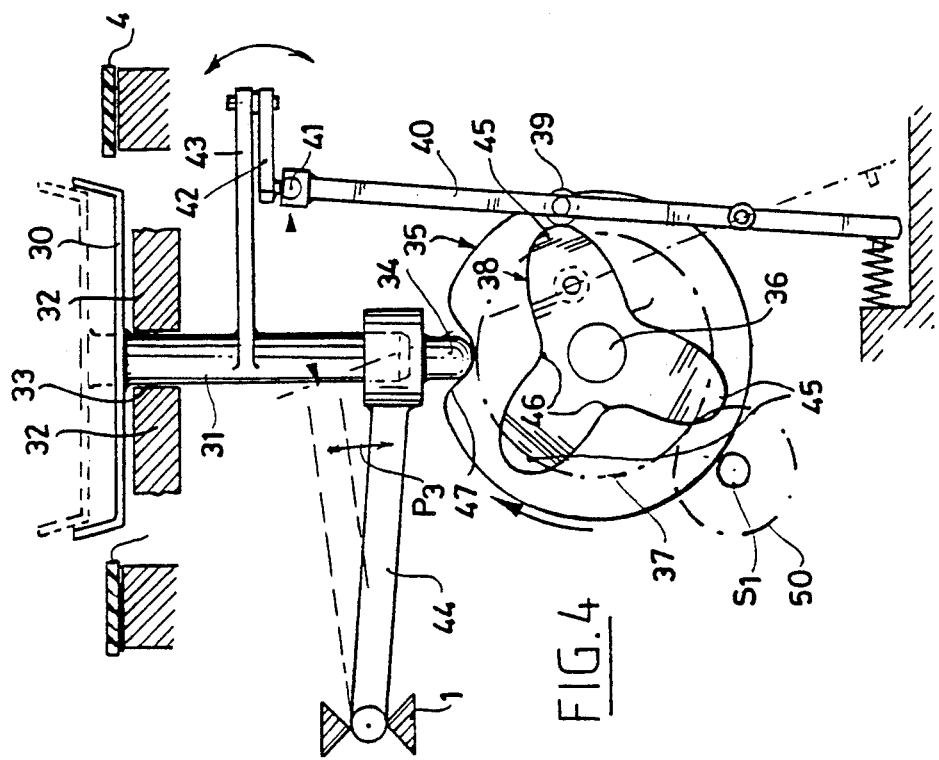

DEVICE FOR STACKING TRAYS WITH ARTICLES

BACKGROUND OF THE INVENTION

The invention relates to a device for stacking trays containing articles, such as eggs.

Such devices are known in many different forms, the problem being that they are either very complex in design and are therefore expensive, or that they are not adapted to adaptable to the existing processing lines for the articles, for example the eggs. A problem which occurs here is that particularly in the case of trays for eggs six trays always have to be stacked on each other, turned alternately through 90°. The trays are usually made of readily flexible material, for example, of compressed paper or the like, and are heavily shaped in order to give sufficient support to the eggs. The use of trays is made difficult through the ready deformation which the tray undergoes and the susceptibility to breakage of the eggs themselves.

SUMMARY AND OBJECTS OF THE INVENTION

The aim of the invention is to provide a device of the type described in the preamble, which is relatively simple in design, can be adapted easily, and can discharge the stack of trays to a storage container without any intervention by the operatives.

The device according to the invention is characterized in that it is provided with a feed conveyor taking the trays one after the other, a discharge conveyor for the trays stacked on each other, and a convey or mechanism operating between feed and discharge conveyor, having at least one up and down operating carrying means for one tray at a time, in addition to a support taking the stacked trays and always rotating through 90°.

The invention is based on the idea that in each case the trays accommodated by the feed conveyor are conveyed in such a way by the conveyor mechanism that they are deposited on the support in a stacked state, and the support always turns through 90° depending on the conveyor mechanism, in order to be able to place the trays as stably as possible.

In a preferred embodiment the discharge convey or extends on either side of the support, which can be moved from a low position to a high position and vice versa. On reaching the desired stack, the support must be lowered, in order to be able to deposit the stack formed onto the discharge conveyor and to discharge it without complicated actions.

. According to a further development of the invention, the carrying means are movable along a closed track extending in a vertical plane, the means being designed as fork-shaped elements projecting on said plane. This permits continuous conveyance of trays, and no reversal of movement is necessary, which facilitates the drive.

The fork-shaped elements can according to the invention preferably be folded up about a horizontal axis of a carrier which is movable along the vertically closed track, but in such a way that on the upward movement a tray can be carried along, and on the downward movement can be released without additional control means.

BRIEF DESCRIPTION OF THE DRAWINGS

In the drawing:
FIG. 3 shows a vertical rear view of the drive of the conveyor mechanism;
FIG. 4 shows a side view of the mechanism of FIG. 3;
FIG. 5 shows a vertical rear view according to the arrow IV in FIG. 4 of the carrying means with folding fork-shaped element according to the invention.

In the figures the same parts are shown by the same reference numbers.

DETAILED DESCRIPTION OF A PREFERRED EMBODIMENT

Figure 1:
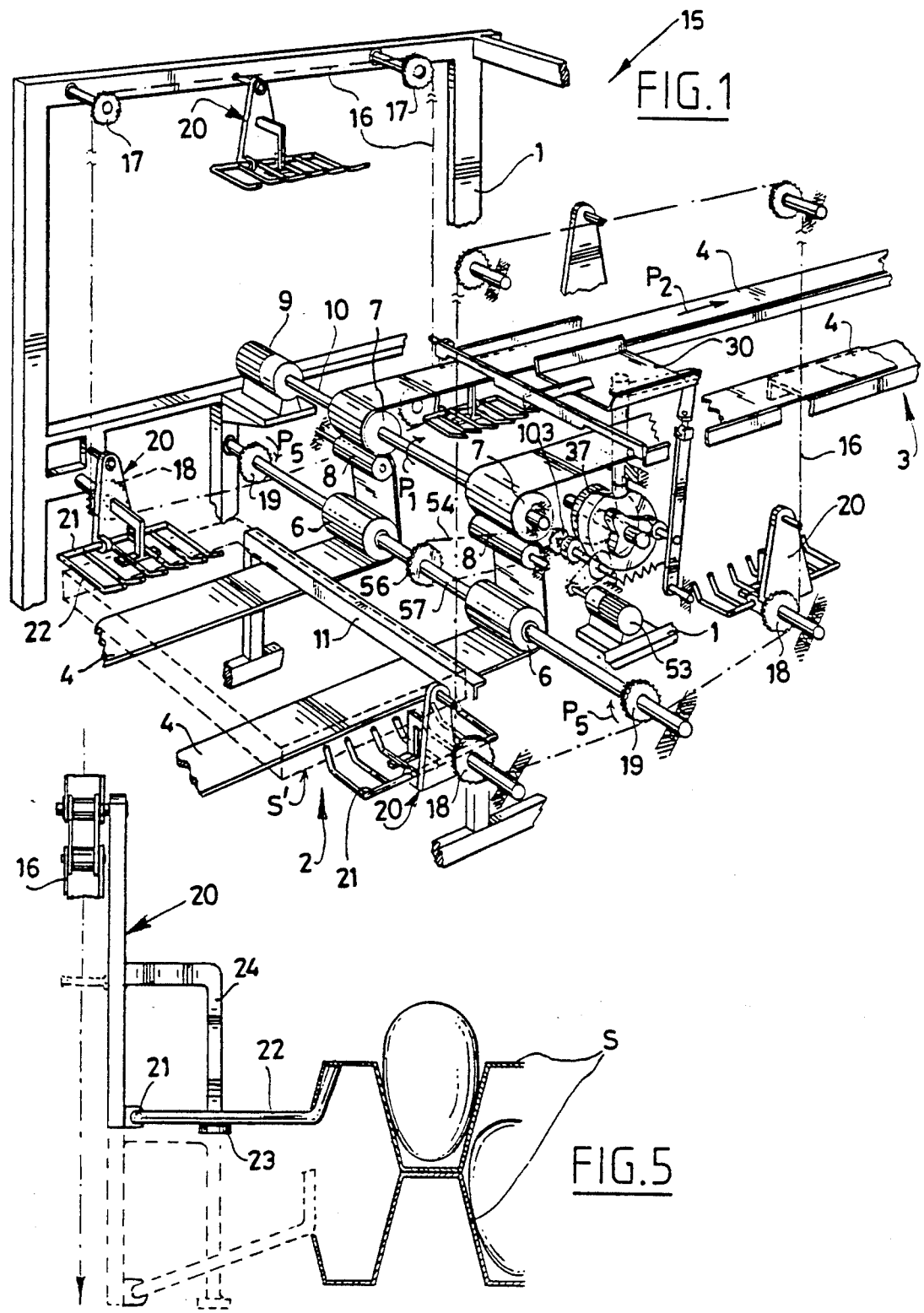
FIG. 1 shows a perspective top view of the device according to the invention.
Figure 2:
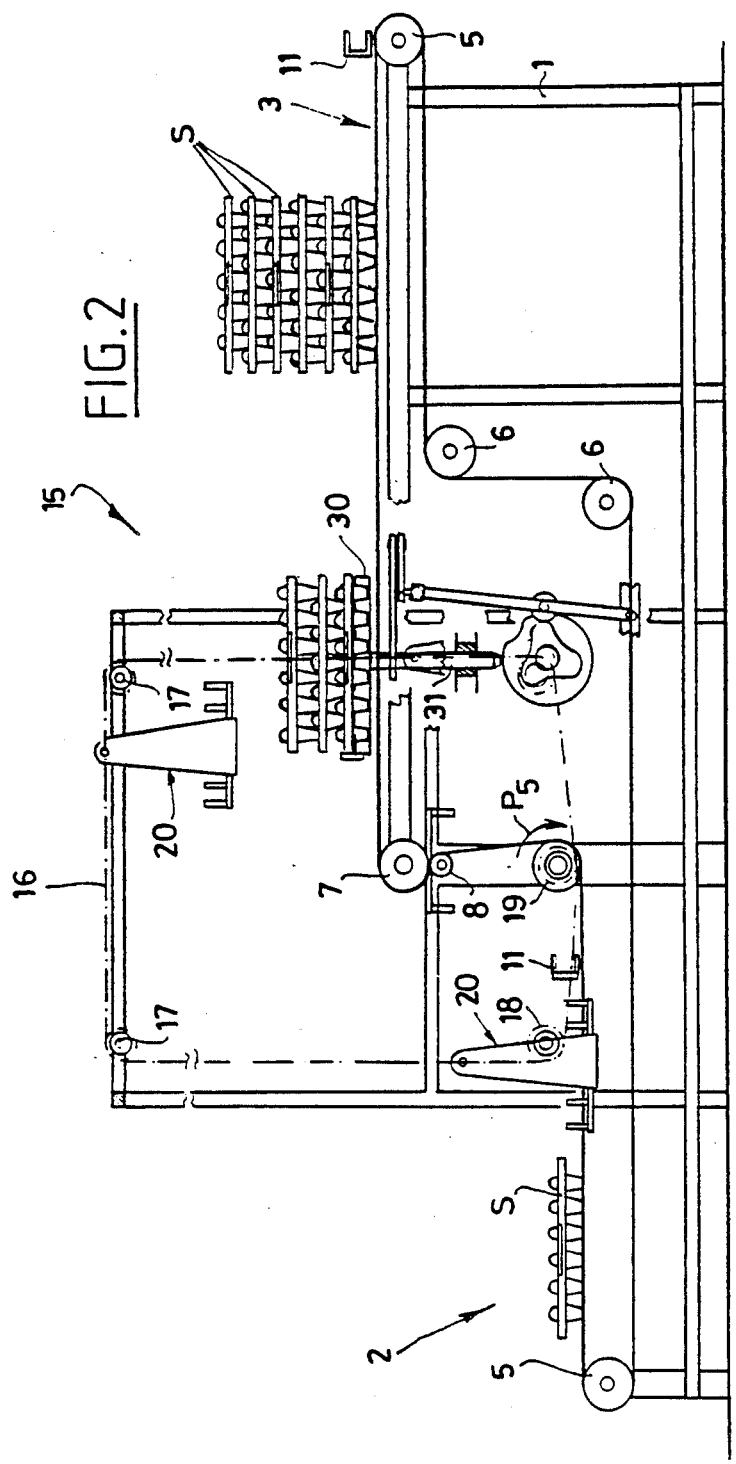
FIG. 2 shows a vertical side view of the device of FIG. 1.

The device has a frame 1, which is essentially made up of sections combined to form a frame. The lefthand side in FIGS. 1 and 2 shows a feed conveyor 2 in the frame, while a discharge conveyor 3 is shown on the righthand side.

In the embodiment shown the feed conveyor and discharge conveyor are formed by a common endless belt 4, two of which are provided parallel and next to each other. The belts 4 run in synchronism and are passed round reversing rollers 5 at the beginning of the feed conveyor and at the end of the discharge conveyor respectively, and guide rollers 6 and drive roller 7 respectively, in such a way that the working part of the belt 4 in the feed convey or is lower down than the working part of the belt in the discharge conveyor. The drive roller 7 is also designed with a pressure roller 8, which increases the turning angle of the belt 4 abut the roller 7 and therefore improves the traction thereon. The roller 7 is driven by a drive motor 9, which drives the shaft 10 of the rollers 7 lying in line with each other, either by means of a transmission or directly, in the direction of the arrow P1, as a result of which the belt follows the direction of the arrow P2 in the working top part thereof.

The working part of the feed conveyor 2 lies at such a height that it can be adjusted to the discharge height of, for example, the collection machines for the eggs placing same in a tray S. The height of the discharge conveyor 3 is such that it is advantageous for manual work, for example the man who has to pick up the stack of trays S.

At the end of the feed conveyor or discharge conveyor there is a fixed stop 11 extending over the full width of the conveyor, and serving to retain a tray S when it is conveyed on the conveyor belts 4.

Provision is made between the feed and discharge conveyors 2, 3 for a conveyor mechanism 15, which deposits the trays one by one from the feed conveyor onto the beginning of the discharge conveyor 3, said beginning being left of the high belt part of the conveyor 4. This conveyor mechanism essentially comprises two chains 16 extending on either side of the conveyor belt 4 in a vertical plane. The chain, for example an ordinary link chain, is conveyed round two top chain wheels 17, two bottom chain wheels 18, and a drive chain wheel 19.

A carrying means 20 is suspended in a swivelling manner from the chain, in such a way that the swivel axis is at right angles to the pane of movement of the chain, and the carrier 20 can swing to and fro in the plane of drawing of FIG. 2.

In the embodiment shown, three carriers are disposed on the chain at equal intervals from each other. The device is such that two carriers 20 are always suspended from the chains 16 precisely opposite each other one either side of the conveyor belt 4. Each carrier has a fork or rake-shaped element, comprising a bar 21 extending in the horizontal direction and having bar-shaped teeth 22 standing perpendicular thereto. The teeth 22 are bent upwards, as can be seen in FIG. 5. The bar 21 is pivoted in the carrier 20, in such a way that the teeth 22 can move upwards in the direction of the arrow P1, and vice versa. The downward movement is prevented by a stop 23, which is fixed to a bracket 24, which forms part of the carrier 20. In this way the element 21, 22 can only move upward from a horizontal position shown in FIG. 5.

Another special element of the device according to the invention is the support 30 which is disposed between the conveyor belts 4, and which is an upward-facing U-shaped section. The legs of the U-shaped section are directed apart according to a predetermined angle, adapted to the trays to be stacked.

The U-shaped support 30 (see FIG. 3) is fixed on a vertical pin 31, which is accommodated in a cross bar 32 of the frame. The pin 31 can move freely up and down in the vertical direction in the through hole 33 provided in the cross bar 32. The bottom side of the pin 31 is provided with a cam follower 34. It rests freely on a cam disk 35, which is mounted on a through-going shaft 36, which forms part of the frame 1. The cam disk 35 is flanked on one side by a gear wheel 37 fixed thereon and on the other side by a second cam disc 38 fixed thereon.

The second cam disc 38 mates with the cam follower 39, which is fixed on an arm 40, which at the bottom end is swivellably mounted in the frame 1. Fixed at the free top end thereof by means of the hinge 41 is an arm 42, which is hingedly connected to an arm 43, which is fixed to the pin 31 and at right angles thereto. For the sake of completeness, it is pointed out that the cam follower 34 can move via a swivel arm 44 mounted in the frame 1 in an upward and downward direction according to the arrow P3.

The cam disc 38 is star-shaped, three projecting cams 45 alternating with dips 46 ensuring that the cam follower 39 makes the arm 40 swing to and fro in the direction of the arrow P4. The swing of the arm 40 is transferred by means of the couple arms 42, 43 in such a way to the pin 31 that on maximum movement from left to right in FIG. 4 of the arm 40 an angular rotation of 90° is carried out on the support 30. On the return movement of the arm an opposite angular rotation of the support through 90° will take place. The cam disc 35 is provided with only one recess 47 in the periphery thereof, so that when there is a revolution of the cam disc 35 the cam follower 34 will sink into the recess 47, causing the support 30 to go into a lower position relative to the frame 1 or the conveyor belts 4. In the remaining part of the cam disc 35 the pin 31 with the support 30 is pressed upwards and will take up a high position relative to the frame or conveyor belt 4.

The cam discs 35, 38 are fixed to the gear wheel 37, which is driven by a pinion 50. The pinion 50 is for this purpose fixed on a drive shaft 51, which can be rotated by means of a chain transmission 52 by a motor 53. On the same shaft 51 which is mounted in the frame provision is made for a second chain wheel 103, around which a chain 54 is passed. This chain 54 leads to a chain wheel 56 which is fixed on a shaft 57. The shaft 57 is mounted so that it is freely rotatable in the rollers 6 and is freely rotatable in the frame 1. The chain wheel 19 is provided at the end of the shaft 57 for driving the chain 16.

The above-described device works as follows. When a tray S containing, for example, eggs and formed according to the standardized dimensions, is placed on the feed conveyor 2 or the working part of the conveyor belts 4, it will be moved to the right in FIG. 2 until the tray comes up against the stop 11. The motor 9 with a predetermined speed drives the belts 4. The motor 53 by means of the chain transmission 52, 54 drives the chain wheels 19 and consequently the two chains 16 in the direction of the arrow P5. The carriers 20 in the left part of the chain 16 (see FIG. 2) are thereby moved upwards, and the rake-shaped or fork-shaped elements 22 will fall into the sides of the trays S and carry this tray upwards. During the further conveyance the carrier 20 is conveyed over the horizontal part to the vertical part of the chain 16, taking with it the tray S which is supported by two opposite carriers 20 and fork-shaped elements 22 on either side. When the downgoing part of the chains 16 goes down the first tray comes to rest on the support 30, which is in the high position. The legs of the U-shaped section fall into the hollows on the bottom side of the egg tray, ensuring adhesion between support 30 and trays. When the carriers 20 drop further, the rake-shaped or fork-shaped elements 22 can easily be removed from the hollows of the tray through the folding-up action of said element relative to the carrier 20 (see FIG. 5). The carriers can move freely down, and under the influence of gravity the element 22 will fall back on the stop 23 once space is given for it. In a higher stack this will last longer than in the case of a single tray.

Due to the fact that there is a synchronism between the drive of the chain 16 and the drive of the cam wheel 38, once a tray is deposited on the support 30 the latter will be turned through 90° as a result of the turning of the cam disc 38 which handles the arm 40 and the turning of the pin 31. The released carrier is conveyed back again via the bottom chain wheels 18 and drive chain 19 to the pick-up position at the beginning of the feed conveyor 2. In this way a number, normally 6, of trays is always placed on the support 30, while after the placing of a tray the support 30 is turned through 90° or turned back so that the trays come to rest on each other turned alternately through 90°. This increases the total stability of the stack which has been formed. Once six trays are placed, the cam wheel 35 will be turned through one revolution, as a result of which the recess 47 comes to rest at the cam follower 34, enabling it to drop, taking the pin 31 with it. The support 30 falls to a low position, thereby causing the bottom side of the tray to come into contact with the top side of the working part of the belts 4. Once sufficient friction has been produced between belt and tray, the total stack will be pushed from the support 30 and taken along to the end stop 11 at the end of the discharge conveyor 3. This conveyor 3 is at such a height that the stack can be removed by hand.

The invention is not restricted to the above-described embodiment. For example, the pick-up mechanism for the trays can be designed differently, depending on the type of tray which has to be stacked. The same applies to the shape of the support 30, which can be of any desired shape. The surface layer of the support 30 can also be adapted to the type of tray.

What is claimed is:

1. A device for the stacking of trays containing eggs comprising a first belt conveyor means movable in a substantially horizontal direction for feeding separate trays, a second belt conveyor means for discharging stacks of trays in line with said first conveyor means and movable in the same direction, a vertically movable and horizontally pivotable support platform in line with said second conveyor means, means including two endless conveyors disposed on either side of said first and second belt conveyor means and having mounted thereon a plurality of pairs of carrying members for transporting separate trays from said first belt conveyor means onto said support platform, said carrying members having horizontally extending forks engageable with hollow parts of a typical egg tray when horizontal to transport the tray, means operatively connected to said support platform for oscillating said support platform through a 90° arc around a vertical axis thereof after a tray is transferred onto said platform whereby the vertical height of the support platform above the second belt conveyor means remains constant during successive 90° oscillations of the support platform, and means responsive to a predetermined number of stacked trays on said support platform for moving said support platform downwardly to deposit said stacked trays onto said second belt conveyor means and subsequently moving said support platform upwardly prior to the start of a new stacking cycle.

2. A device as claimed in claim 1 wherein said second belt conveyor means is at a different level than said first belt conveyor means.

3. A device as claimed in claim 1 wherein said second belt conveyor means comprises a pair of laterally spaced belts and said support platform is disposed between said spaced belts between overlapping portions of said second belt conveyor means.

4. A device as claimed in claim 1 wherein said means for moving said support platform upwardly and downwardly and for oscillating said support platform through a 90° arc comprises a double cam mechanism.

5. A device as claimed in claim 1 wherein said first and second belt conveyor means comprise a single endless conveyor having at least one run thereof passing around vertically spaced guide rollers to define said first and second belt conveyor means at different levels.

6. A device as claimed in claim 1 wherein the carrying members are upwardly pivotable forks which are downwardly biased by gravity.

7. A device as claimed in claim 1 wherein said forks have upwardly extending ends which grip into hollow parts of an egg tray.

8. A device as claimed in claim 1 wherein a said pair of carrying members are disposed opposite each other on either side of the first and second belt conveyor means, the forks of an opposed pair of carrying members extending toward each other and engageable with the outer hollow parts of an egg tray to prevent the tray from bending.

* * * * *